Feb. 9, 1971  C. M. CASON III, ETAL  3,561,869
LIDAR WITH AUTOMATIC SCANNER HAVING FIXED OPTICS
Filed Jan. 22, 1969
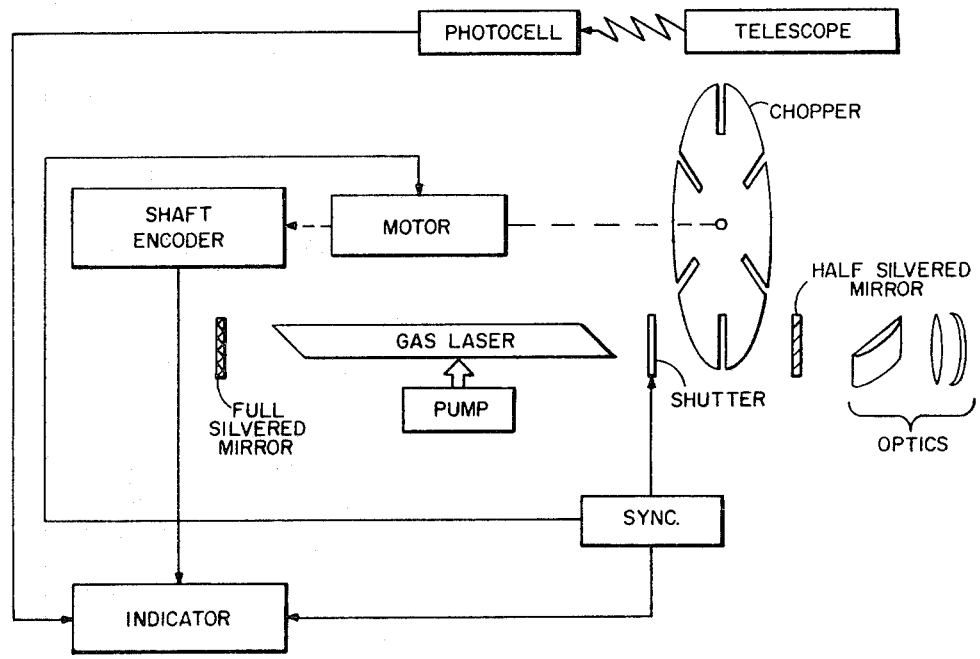
FIG. I
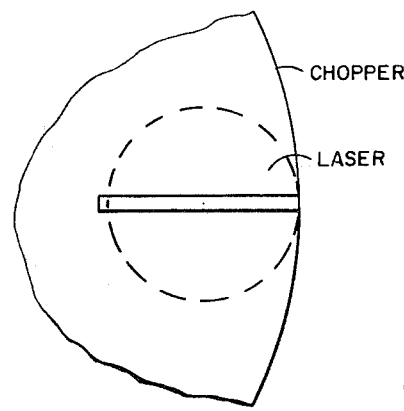
FIG. 2
Charles M. Cason, III
James F. Perkins,
  *INVENTORS.*
BY

3,561,869
LIDAR WITH AUTOMATIC SCANNER HAVING FIXED OPTICS
Charles M. Cason III, and James F. Perkins, Huntsville, Ala., assignors to the United States of America as represented by the Secretary of the Army
Filed Jan. 22, 1969, Ser. No. 792,913
Int. Cl. G01c 3/08
U.S. Cl. 356—4                      8 Claims

ABSTRACT OF THE DISCLOSURE

A lidar (light direction and ranging) system using a gas laser as the light source is shown. The cross-sectional area of the laser is scanned by a narrow slit on a chopper wheel. The particular volume of the laser defined by the slit lases and the resulting light falls on a wide-angle cylindrical lens. The lens causes the light to be deflected from the axis of the laser in accordance with the position of the slit.

BACKGROUND OF THE INVENTION

This invention is in the field of lidars. Various lidar schemes are known, with various ways to achieve scanning of the light beam. These ways include physical rotation of the laser and its optics, oscillating mirrors, and oscillating lenses. All of these mechanical systems have the disadvantages of being mechanically complex, and being weighty. The instant invention avoids these disadvantages, and is relatively simple in construction and operation.

SUMMARY OF THE INVENTION

A scanning lidar system having fixed optics, and a chopper wheel revolving in frotn of a gas laser. The chopper wheel has narrow radial slits. As the slits traverse the laser, lasing occurs in the volume of the laser uncovered by the slits. The optics include a wide-angle cylindrical lens, such that the laser beam is deflected from the axis of the laser in accordance with the position of the slits of the chopper wheel.

BRIEF DESCRIPTION OF THE DRAWINGS

FIG. 1 of the drawings shows a diagrammatic view of the invention, and
FIG. 2 shows an end view of the laser, covered by a portion of the chopper wheel.

DESCRIPTION OF THE PREFERRED EMBODIMENT

Referring to FIG. 1, the invention consists of a gas laser with its pump, and a optical resonant cavity including a full silvered mirror and a half-silvered mirror. Interposed between the half-silvered mirror and the laser are a shutter and a chopper. The chopper is a wheel with narrow radial slits, said wheel being rotated by a motor. Both the motor and shutter are controlled by a sync source. The motor may be a synchronous motor, in order that its speed can be accurately controlled by the sync. The shutter (which may be a Kerr cell) is operated at a high enough repetition rate to open many times as each slit of the chopper traverses the laser. Optics in alignment with the laser include a wide-angle cylindrical lens. The laser beam, which will have a generally rectangular cross section defined by the slits of the chopper wheel, will be deflected by the cylindrical lens in accordance with the position of the slits. The output from the optics will be a scanning, fan-shaped beam. Depending upon the physical orientation of the cylindrical lens and the chopper wheel, the beam may be made to scan either vertically or horizontally. If a reflective target is illuminated by the beam, the reflected light will be "seen" by a telescope included with the invention. Images from the telescope will fall on a photocell, which photocell will provide an electrical output to an indicator. The chopper motor has a shaft encoder connected thereto, with the shaft encoder output connected to the indicator. Also connected to the indicator is an output from the sync source. The indicator may be any of the well-known types of radar display devices, such as B type. The various connections to the indicator allow the indicator to operate in the well-known radar manner. Target range and azmuth may be determined in the usual manner, for a horizontally scanning beam; and range and elevation for a vertically scanning beam.

FIG. 2 shows the relation between the chopper wheel slits and the laser.

While a specific embodiment of the invention has been disclosed, other embodiments may be obvious to one skilled in the art, in light of this disclosure. For example, the chopper wheel may be replaced by an endless band with transverse slits. Also, the half silvered mirror may be omitted, and the slits of the chopper disk replaced by half-silvered mirrors. The photocell, if desired, could be energized and deenergized by the sync source. A PPI or other type of indicator could be used instead of the disclosed B type. The shutter could be omitted and the full silvered mirror replaced by a Q-switch.

What is claimed is:
1. A lidar system including:
   an optical resonant cavity having a longitudinal axis;
   a pumped laser within said cavity having a certain cross-sectional area, and a longitudinal axis collinear with the axis of said cavity;
   a rotating disk having radial slits therein of small width relative to the cross-sectional area of said laser, interposed between said laser and one end of said optical cavity;
   shutter means interposed between said laser and one end of said optical cavity; and
   optics centered on said axis of said cavity, but outside of said cavity.
2. The system as defined in claim 1 wherein said cavity includes two parallel, plane reflectors, one being a substantially full reflector at the laser wavelength, and the other being a partial reflector at the laser wavelength.
3. The system as defined in claim 2 wherein said shutter means is a Kerr cell.
4. The system as defined in claim 3 wherein said optics include a wide-angle cylindrical lens.
5. The system as defined in claim 4 further including means for operating said shutter means and said dish.
6. The system as defined in claim 5 further including radiant energy detecting means responsive to the wavelength of said laser.
7. The system as defined in claim 6 further including means for determining the rotational position of said disk.
8. The system as defined in claim 7 further including indicating means having inputs connected to said detecting means, to said means for determining, and to said means for operating.

(References on following page)

References Cited

UNITED STATES PATENTS

| | | | |
|---|---|---|---|
| 2,524,807 | 10/1950 | Kallmann | 356—4 |
| 3,129,424 | 4/1964 | Rabinow | 356—4X |
| 3,177,446 | 4/1965 | Hoadley et al. | 331—94.5 |
| 3,380,358 | 4/1968 | Neumann | 356—5X |
| 3,389,348 | 6/1968 | De Maria | 331—94.5 |
| 3,423,695 | 1/1969 | Boyden | 331—94.5 |
| 3,432,767 | 3/1969 | Pole et al. | 331—94.5 |
| 3,437,953 | 4/1969 | Buchman | 331—94.5 |
| 3,489,495 | 1/1970 | Blau | 356—4 |

RODNEY D. BENNETT, Jr., Primary Examiner

J. G. BAXTER, Assistant Examiner

U.S. Cl. X.R.

178—7.6; 250—233; 356—5